US 6,786,586 B2
Sep. 7, 2004

(12) United States Patent
Koga et al.

(10) Patent No.: US 6,786,586 B2
(45) Date of Patent: Sep. 7, 2004

(54) INK-JET RECORDING METHOD

(75) Inventors: Chizuru Koga, Ebina (JP); Kiyoshi Hosoi, Ebina (JP); Takashi Ogino, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/417,185

(22) Filed: Apr. 17, 2003

(65) Prior Publication Data

US 2003/0234846 A1 Dec. 25, 2003

(30) Foreign Application Priority Data

Jun. 19, 2002 (JP) ........................................ 2002-178355

(51) Int. Cl.$^7$ ................................ B41J 2/17; B41J 2/01
(52) U.S. Cl. ........................ 347/95; 347/100; 347/101; 347/105
(58) Field of Search ............................ 347/95, 96, 100, 347/101, 105; 106/31.13, 31.6, 31.27; 428/195, 32.1

(56) References Cited

U.S. PATENT DOCUMENTS 6,174,049 B1 * 1/2001 Tachihara et al. ............. 347/65
6,454,402 B1 * 9/2002 Koitabashi et al. ......... 347/101
6,737,128 B2 * 5/2004 Kasahara ................. 428/32.31

FOREIGN PATENT DOCUMENTS

| JP | A 10-166713 | | 6/1998 | |
| JP | 10-166713 | * | 6/1998 | ............ B41M/5/00 |
| JP | A 2000-94825 | | 4/2000 | |
| JP | 2000-094825 | * | 4/2000 | .............. B41J/2/01 |

* cited by examiner

*Primary Examiner*—Manish Shah
(74) *Attorney, Agent, or Firm*—Oliff & Berridge, PLC

(57) ABSTRACT

An ink-jet recording method is provided in that upon carrying out printing at a high speed as equivalent to laser printers by using the plain paper, the optical density and the coloring property of the image are high with less occurrence of intercolor breed and feathering, and the image has high water resistance. The method contains a step of printing on recording paper having base paper mainly containing pulp fibers and a filler by using a pigment ink of at least one color at a scanning speed of a printing head of 25 cm/sec or more and a maximum ink injection amount in a range of from 6 to 30 mL/m$^2$, the ink having a surface tension in a range of from 20 to 35 mN/m, and an aggregation degree of a pigment contained in the ink in contact with a surface of the recording paper being 5 or more.

20 Claims, No Drawings

INK-JET RECORDING METHOD

BACKGROUND OF THE INVENTION

1. Field of the Invention

The present invention relates to a high-speed ink-jet recording method using so-called plain paper having no extra coating layer with an ink of at least one color containing a pigment as a colorant.

2. Description of the Related Art

The ink-jet recording method has such characteristics that color recording can be conveniently carried out, the consuming energy is small, recording noise is small, and the production cost of printers can be suppressed. Owing to the characteristics, the ink-jet recording method is being widely used in offices, and there are increasing occasions where it is used in combination with an electrophotographic recording apparatus, such as laser printer and duplicators.

A recording medium (recording paper) is used in the ink-jet recording method, for example, so-called plain paper, coated paper for ink-jet recording, glossy paper, a white film and a transparency. Particularly, in the case where the ink-jet printer is used in combination with a laser printer and a duplicator in offices, such occasions are the most frequent that the ink-jet recording is applied to plain paper, which has high compatibility with an electrophotographic recording apparats and is available at low cost. Therefore, it is considerably important in the ink-jet recording method to improve recording suitability to plain paper. However, the following problems arise upon printing on plain paper by the conventional ink-jet recording method.

1. The so-called feathering phenomenon occurs, in which an ink flows along fibers of paper. The feathering phenomenon considerably impairs image quality, particularly characters.

2. In general, so-called plain paper is subjected to sizing (water repellency) on the surface thereof. Therefore, absorption of an ink is delayed to cause intercolor breed (ICB) at a part where different colors are in contact with each other.

3. Because the absorption of an ink is delayed due to sizing (water repellency) on the surface of the paper, the back surface of the document is stained upon stacking after printing.

4. A colorant contained in an ink is difficult to remain on the surface of plain paper, and thus, in particular, the coloring property is insufficient.

Along with the penetration of an ink-jet printer into the business market in recent years, the printing speed of the ink-jet printer is intended to be increased to a level equivalent to a laser printer, but the ink absorption cannot be improved with maintenance of image quality.

In order to solve the problems, in JP-A-10-166713, a cationic sizing agent is used, and the Stöckigt sizing degree of base paper is defined. However, the Stöckigt sizing degree herein is remarkably low as from. 3 to 7 seconds to fail to provide an effect of suppressing irregular penetration of an ink, and thus the feathering phenomenon becomes remarkably conspicuous upon using an ink having high permeability, such as those used for high-speed printing.

In JP-A-2000-94825, high-speed printing and prevention of the feathering phenomenon are simultaneously attained by using a combination of recording paper having a dissociative polyvalent metallic salt coated on the surface of base paper in an amount of from 0.1 to 2.0 g/m² and a pigment ink having an acid value of from 30 to 300 mgKOH/g and a surface tension of from 30 to 45 mN/m. However, prevention of the feathering phenomenon and improvement in density can be realized by attaining such an effect that the pigment contained in the ink is aggregated to make coarse grains on the surface of the recording paper irrespective to the species of the metallic salt and the polymer. Therefore, in the case where the coating material coated on the base paper penetrated into the base paper, there is a less effect of aggregating the pigment even though the coated amount is in the defined range to fail to obtain an improving effect of image quality.

SUMMARY OF THE INVENTION

The invention has been developed to solve the problems associated with the conventional art.

The invention is to provide such an ink-jet recording method in that upon carrying out printing at a high speed as equivalent to laser printers by using the so-called plain paper, the optical density and the coloring property of the image are high with less occurrence of intercolor breed and feathering, and the image has high water resistance.

As a result of earnest investigations made by the inventors on the problems, it has been found that the number of coarse particles of a pigment contained in an ink immediately after contacting with the surface of the recording paper is an important factor on image quality. More specifically, it has been found that in the case where the number of the pigment having a particle diameter of 1 μm or more contained in the ink after contacting the surface of the recording paper is 5 time or more the number of the pigment having a particle diameter of 1 μm or more contained in the ink before contacting the surface of the recording paper, the pigment dots not flow out along with a vehicle but remains on the surface of the recording paper even at a high absorption rate of the ink, and thus sharp printing can be carried out at a high speed.

The ink-jet recording method of the invention contains, as one aspect, a step of printing on recording paper having base paper mainly containing pulp fibers and a filler by using a pigment ink of at least one color at a scanning speed of a printing head of 25 cm/sec or more and a maximum ink injection amount in a range of from 6 to 30 mL/m², the pigment ink having a surface tension in a range of from 20 to 35 mN/m, and an aggregation degree of a pigment contained in the pigment ink in contact with a surface of the recording paper being 5 or more.

The ink-jet recording method of the invention contains, as another aspect, a step of printing on recoding paper having base paper mainly containing pulp fibers and a filler by using a pigment ink of at least one color at a conveying speed of the paper of 6 cm/sec or more with a printing head being fixed and a maximum ink injection amount in a range of from 6 to 30 mL/m², the pigment ink having a surface tension in a range of from 20 to 35 mN/m, and an aggregation degree of a pigment contained in the pigment ink in contact with a surface of the recording paper being 5 or more.

DESCRIPTION OF THE PREFERRED EMBODIMENTS

The invention will be described in detail below.

The ink-jet recording method of the invention in one aspect contains a step of printing on recording paper having base paper mainly containing pulp fibers and a filler by using a pigment ink of at least one color at a scanning speed of a printing head of 25 cm/sec or more and a maximum ink injection amount in a range of from 6 to 30 mL/m². The pigment ink has a surface tension in a range of from 20 to 35 mN/m, and an aggregation degree of a pigment contained in the pigment ink in contact with a surface of the recording paper is 5 or more.

The ink-jet recording method of the invention in another aspect contains a step of printing on recording paper having base paper mainly containing pulp fibers and a filler by using a pigment ink of at least one color at a conveying speed of the paper of 6 cm/sec or more with a printing head being fixed and a maximum ink injection amount in a range of from 6 to 30 mL/m. The pigment ink has a surface tension in a range of from 20 to 35 mN/m, and an aggregation degree of a pigment contained in the pigment ink in contact with a surface of the recording paper is 5 or more.

The recoding paper in the invention will be firstly described.

In the recording paper in the invention, base paper mainly containing pulp fibers and a filler is used. The base paper is formed with such pulp as chemical pulp, e.g., hardwood bleached craft pulp, hardwood non-bleached craft pulp, softwood bleached craft pulp, softwood non-bleached craft pulp, hardwood bleached sulfite pulp, hardwood non-bleached sulfite pulp, softwood bleached sulfite pulp and softwood non-bleached sulfite pulp, and pulp produced by chemically treating wood and a fiber material such as cotton, linen and bark. Furthermore, ground wood pulp obtained by mechanically processing wood or chips into pulp, chemi-mechanical pulp obtained by impregnating wood and chips with a chemical reagent, followed by mechanically processed into pulp, and thermomechanical pulp obtained by cooking chips with steam until slightly softening them, followed by processed into pulp with a refiner can also be used. These kinds of pulp may be used as virgin pulp, and recycled paper pulp may be added depending on necessity.

In the case where virgin pulp is used, it is preferably subjected to a bleaching treatment with such a method as a bleaching method using chlorine dioxide but using no chlorine gas (elementally chlorine fee (ECF) method) and a bleaching method mainly using ozone and hydrogen peroxide but using no chlorine compound (total chlorine free (TCF) method).

Examples of a raw material of the waste paper pulp that can be mixed include non-printed waste paper, such as white high quality paper, white super-high quality paper, white medium quality paper and white broken paper, formed by cutting, breakage and width adjustment in bookbinding factories, printing factories and cutting factories; high quality printed waste paper, such as high quality paper and high quality coated paper having been printed or duplicated; waste paper having written with an aqueous ink, an oily ink or a pencil; waste newspaper including handbills, such as woodfree paper, woodfree coated paper, mechanical paper and mechanical coated paper having been printed, and waste paper of mechanical paper, mechanical paper and groundwood paper.

The waste paper pulp used in the base paper used in the invention is preferably that obtained by subjecting the waste paper material to at least one of an ozone bleaching treatment and a hydrogen peroxide bleaching treatment. In order to obtain paper having a high brightness, it is preferred that the mixing ratio of the waste paper pulp obtained by the bleaching treatment is in a range of from 50 to 100%. Furthermore from the standpoint of recycling of resources, it is more preferred that the mixing ratio of the waste paper pulp is in a range of from 70 to 100%.

The ozone bleaching treatment has such a function that a fluorescent dye, which is generally contained in woodfree paper, is decomposed, and the hydrogen peroxide bleaching treatment has such a function that yellowing due to an alkali used on a deinking treatment is prevented. It has been known that the combination of these two treatments particularly not only facilitates deinking of waste paper but also improves the brightness of pulp. Furthermore, it also has a function of decomposing and removing remaining chlorine compounds in the pulp, and thus it has a significant effect on reduction of the organic halogen compound content in waste paper using pulp having been bleached with chlorine.

A filler is added to the base paper used in the invention in order to adjust the opacity, the brightness and the surface property. Particularly, in the case where the halogen content in the paper is to be reduced, it is preferred to use a filler containing no halogen. Examples of the filler that can be used in the invention include a white inorganic pigment, such as ground calcium carbonate, precipitated calcium carbonate, chalk, kaolin, calcined clay, talc, calcium sulfate, barium sulfate, titanium dioxide, zinc oxide, zinc sulfide, zinc carbonate, aluminum silicate, calcium silicate, magnesium silicate, synthetic silica, aluminum hydroxide, alumina, sericite, white carbon, saponite, calcium montmorillonite, sodium montmorillonite and bentonite, and an organic pigment, such as an acrylic plastic pigment, polyethylene and a urea resin. In the case where waste paper is mixed, it is necessary that the addition amount of the filler is adjusted taking the ash content of the waste paper raw material into consideration.

The mixing amount of the filler is not particularly limited and is preferably in a range of from 1 to 80 parts by weight per 100 parts by weight of the pulp fibers.

It is preferred upon paper making that the fiber orientation ratio is adjusted to a range of from 1.0 to 1.55, more preferably in a range of from 1.0 to 1.45, and further preferably in a range of from 1.0 to 1.35. By adjusting to such a range, the paper (recording paper) after printing by the ink-jet method can be suppressed in curling. The fiber orientation ratio referred herein means a fiber orientation ratio measured by the ultrasonic wave velocity method and can be expressed by such a value that is obtained by dividing the ultrasonic wave velocity in the machine direction (MD) (traveling direction of the paper machine) of the paper by the ultrasonic wave velocity in the cross direction (CD) (direction perpendicular to the traveling direction of the paper machine) of the paper which is shown in the following equation.

Fiber orientation ratio of base paper by ultrasonic wave velocity method ($T/Y$ ratio)=($MD$ ultrasonic wave velocity)/($CD$ ultrasonic wave velocity)

The fiber orientation ratio by the ultrasonic wave velocity method herein is measured by using Sonic Sheet Tester (produced by Normura Shoji Co., Ltd.).

In the ink-jet recording method of the invention, such an ionicity is imparted on the surface of the recording paper that is opposite to that of the surface of the pigment contained in the ink or the pigment dispersant, whereby the pigment is aggregated. Furthermore, there is also such a case that a polymer having such an ionicity that is opposite to the surface of the paper is contained in the ink to form an insoluble polyion complex, whereby the pigment is fixed by encompassing therewith In general, the surface of the pigment or the pigment dispersant often has an anionic nature. Therefore, the surface of the recording paper is often adjusted to be cationic. Examples of a substance for adjusting the surface of the recording paper to a cationic nature (i.e., a cationic substance) include a hydrophilic cationic resin, a cationic surfactant and a polyvalent metallic salt. An organic amine salt and an onium salt may also be used.

Examples of the cationic resin include a cationic aqueous polymer, and examples of the cationic surfactant include a primary, secondary or ternary amine salt and a quaternary ammonium salt.

Examples of the cationic aqueous polymer include a copolymer of a hydrophilic monomer component having an amino group or a quaternary amino group and a hydrophobic monomer component, and a salt thereof, with which other components may be copolymerized depending on necessity. The copolymer may have any structure, such as a random structure, a graft structure and a block structure.

Examples of the hydrophobic monomer component include styrene, a styrene derivative, vinyltoluene, a vinyltoluene derivative, vinylnaphthalene, a vinylnaphthalene derivative, butadiene, a butadiene derivative, isoprene, an isoprene derivative, ethylene, an ethylene derivative, propylene, a propylene derivative, an alkyl ester of acrylic acid and an alkyl ester of a methacrylic acid. Preferred examples of the hydrophobic monomer component among these include styrene, a styrene derivative, an alkyl acrylate and an alkyl methacrylate. The alkyl group preferably has a carbon number in a range of from 1 to 10, and more preferably in a range of from 1 to 6.

Examples of the other components include acrylamide, an acrylamide derivative, dimethylaminoethyl methacrylate, ethoxyethyl methacrylate, butoxyethyl methacrylate, ethoxytriethylene methacrylate, vinylpyrrolidone, vinylpyridine, a component containing polyoxyethylene, such as an alkyl ether, methoxypolyethylene glycol methacrylate and polyethylene glycol methacrylate, and a component containing a hydroxyl group, such as hydroxymethyl methacrylate, hydroxyethyl methacrylate and vinyl alcohol.

Examples of the hydrophilic monomer having an amino group or a quaternary amino group include a compound obtained by quaternarizing such a compound as N,N-dimethylaminoethylmethacrylamide, N,N-dimethylaminoethylacrylamide, N,N-dimethylacrylamide, N,N-dimethylmethacrylamide, N,N-dimethylaminopropylacrylamide and N,N-dimethylaminoethylmethacrylamide. Examples of a compound used for the quaternarization include methyl chloride, methyl iodide, dimethyl sulfide, benzyl chloride and epichlorohydrin.

Examples of the compound of a primary, secondary or tertiary amine salt and a quaternary ammonium salt include dodecyltimethylammonium chloride, dodecylbenzyltrimethyl chloride, dodecyldimethylbenzylammonium chloride, stearyltrimethylammonium chloride, benzyltributylammonium chloride, benzalkonium chloride and cetyltrimethylammonium chloride. Examples of the amine salt include an ethylene oxide adduct of a higher alkylamine, such as dihydroxyethylstearylamine. Examples of the pyridinium salt compound include cetylpyridinium chloride and cetylpyridinium bromide. Examples of an imidazoline cationic compound include 2-heptadecenyl-hydroxyethylimidazoline. A so-called cationic surfactant may also be diverted.

Examples of the polyvalent metallic salt include $Ca(NO_3)_2$, $CaCl_2$, $Ca(CH_3COO)_2$, $CaSO_4$, $Al(NO_3)_3$, $AlCl_3$, $Nd(NO_3)_3$, $Y(NO_3)$, $Cu(NO_3)_2$, $Zn(NO_3)_2$, $CuCl_2$, $ZnCl_2$, $CoCl_2$, $Co(NO_3)_2$, $NiCl_2$, $MgBr_2$, $Mg(NO_3)_2$, $MgCl_2$, $Mg(CH_3COO)_2$, $MgSO_4$, $ZnBr_2$, $NH_4Cl$ and $Ni(NO_3)_2$. As the foregoing cationic substance, those having water solubility or in the form of an aqueous emulsion may be used.

However, in order to adjust the sizing degree in a more convenient manner, it is preferred to use a water soluble cationic substance.

An example of a method for containing the cationic substance in the base paper will be described A solution of the cationic substance mainly containing water is prepared. At this time, a pigment and a resin may be added depending on necessity. Examples of the pigment include an inorganic pigment, such as amorphous silica, alumina, hydrated alumina and calcium carbonate, urea-formaldehyde resin fine particles and melamine-formaldehyde resin fine particles, but it is not limited to these examples. Examples of the resin include polyvinyl alcohol, modified cationic polyvinyl alcohol, cationic starch, oxidized starch, anionic starch and nonionic starch, but it is not limited to these examples.

The resulting solution can be coated on the surface of the base paper by a method ordinarily employed, such as size press, shim size, a gate roll, a roll coater, a bar coater, an air knife coater, a rod blade coater and a blade coater. The coated base paper is then subjected to a drying step to obtain the recording paper used in the invention.

In the invention, a polyvalent metallic salt and/or a cationic resin are preferred as the cationic substance to be coated on the surface of the base paper, and the coated amount of the polyvalent metallic salt and/or the cationic resin coated on the surface of the base paper is preferably in a range of from 0.1 to 3 $g/m^2$. When the coated amount is less than 0.1 $g/m^2$, the reaction with the pigment and the anionic polymer described later contained in the ink is attenuated, and as a result, there are some cases where deterioration in image quality, such as decrease in density, intensifying in feathering, deterioration in ICB and deterioration in color reproducibility, occurs. When the coated amount exceeds 3 $g/m^2$, the permeability of the ink is deteriorated, and there are some cases where a problem of drying failure occurs in high-speed printing.

The coated amount of the polyvalent metallic salt and/or the cationic resin is preferably in a range of from 0.1 to 3.0 $g/m^2$, and more preferably in a range of from 1.0 to 2.0 $g/m^2$.

The sizing degree of the recording paper can be adjusted to the necessary value only with the cationic substance. However, in the case where the adjustment of the sizing degree is insufficient only with the cationic substance, a surface sizing agent may also be used. Examples of the surface sizing agent include a rosin sizing agent, a synthetic sizing agent, a petroleum resin sizing agent, a neutral sizing agent, starch and polyvinyl alcohol. Furthermore, the sizing degree may also be adjusted previously by mixing an internal sizing agent in the step of making a slurry during the paper making process. In the case where the halogen amount in the recording paper is to be reduced, it is preferred to use an internal sizing agent and a surface sizing agent that contain no halogen. Specifically, a rosin sizing agent, a synthetic sizing agent, a petroleum resin sizing agent and a neutral sizing agent can be used. A fixing agent for fibers may be used in combination with the sizing agent. In this case, for example, aluminum sulfate can be used as the sizing agent, and cationic starch can be used as the fixing agent. From the standpoint of improvement of the storage stability of the recording paper, it is preferred to use a neutral sizing agent. The sizing degree is adjusted with the addition amount of the sizing agent.

The recording paper used in the invention preferably has a Stöckigt sizing degree in a range of from 10 to 60 seconds, and more preferably in a range of from 15 to 30 seconds. When the Stöckigt sizing degree is less than 10 seconds, the feathering phenomenon is intensified in the ink-jet recording method, and there are some cases where small characters cannot be recognized, and printed bar codes cannot be read, whereby practical usefulness is impaired When the Stöckigt sizing degree exceeds 60 seconds, on the other hand, penetration of an ink is delayed to cause intercolor breed whereby the color image quality is deteriorated.

The Stöckigt swing degree herein is a Stöckigt sizing degree defined in JIS P8122 (1976) measured in the standard environment (temperature: 23° C., relative humidity: 50% RH) defined in JIS P8111 (1998).

The recording paper used in the invention preferably has a smoothness degree in a range of from 20 to 100 seconds, and more preferably in a range of from 70 to 100 seconds, from the standpoint that the toner transfer property upon using for the electrophotographic process is improved, and the graininess is improved. When the smoothness degree is less than 20 seconds, there are some cases where the graininess is deteriorated. When the smoothness degree exceeds 100 seconds, the paper is pressed at a high pressure in a wet state upon production to obtain a high smoothness degree. As a result, there are some cases where the opacity of the paper is reduced, and curling after printing is increased upon ink-jet printing, and thus it is not preferred as the recording paper.

The smoothness degree herein can be measured according to JIS P8119 (1998).

The recording paper used in the invention preferably has a formation index of 20 or more, and more preferably 30 or more, from the standpoint of prevention of mottle as improvement of image quality in image formation by the electrophotographic process. When the formation index is less than 20, penetration of a toner into the paper upon heat fusion of the toner in the electrophotographic process becomes uneven, and thus nebular macular (mottle) is formed to impair the image quality.

The formation index herein is measured by using a three-dimensional sheet analyzer (M/K 950, produced by M/K Systems, Inc. (MKS)) with an aperture of 1.5 mm in diameter by using a microformation tester (MFT). That is, a sample is mounted on a rotating drum in the three-dimensional sheet analyzer, and the local difference in basis weight in the sample is measured as a difference in light amount with a light source attached to the drum axis and a photodetector attached outside the drum corresponding to the light source. The range to be measured herein is defined by the diameter of the aperture attached to the light incident part of the photodetector. The difference in light amount (deviation) is amplified and subjected to A/D conversion, and it is then classified into 64 grades in basis weight in terms of optical measurement. Data are taken 1,000,000 times per one scanning operation, and histogram frequency for the data is obtained. The maximum frequency (peak value) in the histogram is divided by the number of grades having a frequency of 100 or more among the grades having been classified into those corresponding to 64 minute basis weights, and the resulting value is divided by 100. The value thus obtained is designated as the formation index. A larger formation index means better formation.

As described in the foregoing, in the case where the recording paper in the invention is used as recording media for electrophotography, thermal transfer and as a recording medium for both of them, it is preferred that an electroconductive agent is mixed to adjust the surface electric resistance of the paper. Herein, it is also preferred that an electroconductive agent containing no halogen is preferably used for reduction of the halogen amount in the paper. Examples of the electroconductive agent include an inorganic electrolyte, such as sodium sulfate, sodium carbonate, lithium carbonate, sodium metasilicate, sodium tripolyphosphate and sodium metaphosphate, an anionic surfactant, such as a sulfonate salt, a sulfate ester salt, a carboxylate salt and a phosphate salt, a cationic surfactant, a nonionic surfactant, such as polyethylene glycol, glycerin and sorbit, an amphoteric surfactant, and a polymer electrolyte.

As a method for controlling penetration of the coating composition into the base paper in the coating step, it is preferred that the base paper before coating is subjected to a calender treatment to adjust the air permeability of the base paper to a range of from 10 to 30 seconds. When the air permeability of the base paper is increased, penetration of the coating composition into the interior of the base paper can be suppressed. However, when the air permeability of the base paper is too high, permeability of an ink upon ink-jet printing is impaired to cause intercolor breed and deterioration in drying property.

It is also effective as a method for suppressing penetration of the coating composition into the base paper that starch, polyvinyl alcohol or a derivative thereof is used as a binder of the coating composition to increase the viscosity thereof.

It is also possible to such a method that base paper is obtained by drying without subjecting a size press step after paper making, and the base paper is separately subjected to a size press step to decrease penetration of the coating composition into the base paper.

The recording paper used in the invention preferably has a surface resistance at least on the surface to be subjected to printing in a range of from $1.0 \times 10^9$ to $1.0 \times 10^{11}$ $\Omega$ per square, more preferably in a range of from $5.0 \times 10^9$ to $7.0 \times 10^{10}$ $\Omega$ per square, and further preferably in a range of from $5.0 \times 10^9$ to $2.0 \times 10^{10}$ $\Omega$ per square. The surface resistance herein means the resistance on the surface having the polyvalent metallic salt and/or the cationic resin coated thereon.

The recording paper used in the invention preferably has a volume resistivity in a range of from $1.0 \times 10^{10}$ to $1.0 \times 10^{12}$ $\Omega \cdot cm$, more preferably in a range of from $1.3 \times 10^{10}$ to $1.6 \times 10^{11}$ $\Omega \cdot cm$, and further preferably in a range of from $1.3 \times 10^{10}$ to $4.3 \times 10^{10}$ $\Omega \cdot cm$.

The surface resistance and the volume resistivity herein are measured according to JIS K6911 for the recording paper having been adjusted for humidity by storing under the conditions of 22° C. and 55% RH for 24 hours.

In the recording paper in the invention, the values of surface electric resistance and volume resistivity are indexes for the extent of penetration of the polyvalent metallic salt and/or the cationic resin into the interior of the base paper (i.e., the distribution mode of the polyvalent metallic salt and/or the cationic resin in the vicinity of the surface of the recording paper), and the values of sure electric resistance and volume resistivity are controlled by the extent of penetration. The extent of penetration of the polyvalent metallic salt and/or the cationic resin into the interior of the base paper varies depending on the species of the various materials and can be appropriately controlled by adjusting the air permeability of the base paper, the Stöckigt sizing degree of the base paper, and the viscosity of the coating composition containing the cationic resin. It is also possible to employ such a method that base paper is obtained by drying without subjecting a size press step after paper making, and the base paper is separately subjected to a size press step to decrease penetration of the cationic resin into the base paper.

In the case where the extent of penetration of the polyvalent metallic salt and/or the cationic resin into the interior of the base paper is too high or too low, the distribution mode of the cationic resin in the-vicinity of the surface of the recording paper becomes unfitted to fail to satisfy the particular ranges in surface electric resistance and volume resistivity defined in the foregoing. Specifically, for example, in the case where the extent of penetration of the cationic resin into the interior of the base paper is too high, there is such a tendency that the volume resistivity of the recording paper is lowered to cause transfer failure of a toner in the electrophotographic process, and there is also such a tendency that the amount of the cationic resin remaining on the surface of the paper is decreased, whereby a colorant is difficult to remain on the surface of the paper in the ink-jet recording method to lower the coloring property of the color image in particular. In the case where the extent of penetration is too low, on the other hand, the surface electric resistance is lowered, and there is also such a tendency that transfer failure of a toner occurs in the electrophotographic process.

The descriptions herein have been made for the case where a cationic nature is imparted to the recording paper, but the recording paper in the invention is not limited to that having a cationic nature. Because there is a cationic nature on the surface of the pigment and the pigment dispersion, it is effective in this case that the recording paper is adjusted to have an anionic nature. In this case, an anionic solution mainly containing water is prepared by using a water soluble anionic substance, and the solution is coated on the base paper, whereby an anionic nature can be imparted to the recording paper.

Examples of the anionic substance include a sulfonate salt having an $SO_3H$ group, a sulfonic acid derivative, a phosphate ester salt having an $H_3PO_4$ group, an $\alpha,\beta$-ethylenic unsaturated carboxylic salt having a COOH group and an aliphatic alcohol ester thereof, acrylic acid, an acrylic acid derivative, methacrylic acid a methacrylic acid derivative, maleic acid, a maleic acid derivative, itaconic acid, an itaconic acid derivative, fumaric acid, and a salt or a derivative of fumaric acid. These substances may be used as a hydrophilic monomer component to be formed into a polymer, such as a homopolymer or a copolymer with other components.

A so-called anionic surfactant may also be diverted. Examples of the anionic surfactant include an alkylbenzene sulfonate salt, an alkylnaphthalene sulfonate salt, a formalin adduct of an alkylbenzene sulfonate salt, a higher fatty acid salt, a sulfate ester of a higher fatty acid ester, a sulfonate salt of a fatty acid ester, a sulfite ester and a sulfonate ester of a higher alcohol ether, an alkylcarboxylate salt of a higher alkylsulfonamide, a sulfosuccinate salt and an ester salt thereof, an alkyl phosphite salt, an alkyl phosphate salt, an alkylphosphonate salt and an ester thereof, and a higher alcohol phosphate ester salt.

An ink used in the invention will be described.

The ink used in the invention contains at least a pigment, a water soluble organic solvent, water and a surfactant, and in addition to these, a pigment dispersant, an anionic compound and various kinds of additives may be contained. The pigment includes not only a hydrophobic pigment, which is dispersed in the ink by adding a pigment dispersant having a hydrophilic group, but also a self dispersing pigment described later. An example using the so-called self dispersing pigment will be described herein, but the ink used in the invention is not limited to the example.

As the ink in the invention, an aqueous ink can be used. Examples of an ink set include an ink set having at least black, cyan, magenta and yellow inks, which are prepared by using water, a water soluble organic solvent, a pigment and a surfactant as essential ingredients.

The ink is prepared by using water, a water soluble organic solvent, a pigment and a surfactant as essential ingredients, and a self dispersing pigment, which can be dispersed in water without a pigment dispersant, is used as the pigment. The self dispersing pigment, i.e., a pigment capable of being dispersed in water without a pigment dispersant, herein means such a pigment that contains a large amount of a water-solubilizing group on the surface thereof and thus can be stably dispersed without a pigment dispersant.

The "pigment capable of being dispersed in water without a pigment dispersant" herein means a pigment satisfying the following conditions. A pigment is dispersed in water without the use of a pigment dispersant to a pigment concentration of 5% by weight and a water concentration of 95% by weight by using a dispersing apparatus, such as an ultrasonic homogenizer, a nanomizer, a microfluidizer and a ball mill. The dispersion containing the pigment dispersed then is placed in a glass bottle and allowed to stand for 24 hours. The pigment concentration of the supernatant after standing is necessarily 98% or more of the initial concentration. The measurement method for the pigment concentration herein is not particularly limited, and examples thereof include a method of drying the sample and then measuring a solid content, and a method of diluting the sample to a suitable concentration and then measuring the transmittance thereof. Other methods can also be employed as far as the pigment concentration can he accurately measured thereby.

The "pigment capable of being dispersed in water without a pigment dispersant" can be produced by subjecting an ordinary pigment to a surface modifying treatment, such as an acid or base treatment, a coupling agent treatment, a polymer grafting treatment, a plasma treatment and an oxidation or reduction treatment The pigment thus subjected to the treatment has a water-solubilizing group in an amount larger than that of the ordinary pigment, whereby it can be dispersed in good conditions without the use of a pigment dispersant.

Examples of the ordinary pigment to be subjected to the surface modifying treatment include Raven 7000, Raven 5750, Raven 5250, Raven 5000 ULTRA II, Raven 3500, Raven 2000, Raven 1500, Raven 1250, Raven 1200, Raven 1190 ULTRA II, Raven 1170, Raven 1255, Raven 1080 and Raven 1060 (all produced by Columbian D Carbon Corp.); Regal 400R, Regal 330R, Regal 660R, Mogul L, Black Pearls L, Monarch 700, Monarch 800, Monarch 880, Monarch 900, Monarch 1000, Monarch 1100, Monarch 1300 and Monarch 1400 (all produced by Cabot Oil & Gas Corp.); Color Black FW1, Color Black FW2, Color Black FW2V, Color Black 18, Color Black FW200, Color Black S150, Color Black S 160, Color Black S170, Printex 35, Printex U, Printex V, Printex 140U, Printex 140V, Special Black 6, Special Black 5, Special Black 4A and Special Black 4 (all produced by Degussa AG); No. 25, No. 33, No. 40, No. 47, No. 52, No. 900, No. 2300, MCF-88, MA600, MA7, MA8 and MA100 (all produced by Mitsubishi Chemical Corp.); C.I. Pigment Blue 1, C.I. Pigment Blue 2, C.I. Pigment Blue 3, C.I. Pigment Blue 15, C.I. Pigment Blue 15:1, C.I. Pigment Blue 15:3, C.I. Pigment Blue 15:34, C.I. Pigment Blue 16, C.I. Pigment Blue 22, C.I. Pigment Blue 60, C.I. Pigment Red 5, C.I. Pigment Red 7, C.I. Pigment Red 12, C.I. Pigment Red 48, C.I. Pigment Red 48:1, C.I. Pigment Red 57, C.I. Pigment Red 112, C.I. Pigment Red 122, C.I. Pigment Red 123, C.I. Pigment Red 146, C.I. Pigment Red 168, C.I. Pigment Red 184, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 128, C.I. Pigment Yellow 129, C.I. Pigment Yellow 151 and C.I. Pigment Yellow 154, but it is not limited to these. Magnetic fine particles, such as magnetite and ferrite, and titanium black can also be used.

As the "pigment capable of being dispersed in water without a pigment dispersant", commercially available products may be used as they are. Examples of the commercially available pigment include cab-o-jet-200, cab-o-jet-300, IJX-55, IJX-164, IJX-253, IJX-266 and IJX-273, produced by Cabot Oil & Gas Corp.; Microjet black CW-1, produced by Orient Chemical Co., Ltd; and pigments available from Nippon Shokubai Co., Ltd.

The water-solubilizing group contained in the "pigment capable of being dispersed in water without a pigment dispersant" may be either nonionic, cationic or anionic, and a sulfone group, a carboxyl group, a hydroxyl group and a phosphoric acid group are mainly preferred. In the case of a sulfone group, a carboxyl group and a phosphoric acid group, they may be used in the form of a free acid or may be used after forming a salt. In the case where an acid is formed, in general, a counter ion for the acid is preferably Li, Na, K, $NH_4$ or an organic amine.

The content of the pigment is preferably in a range of from 0.1 to 15% by weight, more preferably in a range of from 0.5 to 10% by weight, and further preferably in a range of from 1.0 to 8.0% by weight, based on the total weight of the ink. When the content of the pigment exceeds 15% by weight, clogging is liable to occur at a tip end of a nozzle of a printing head, and when it is less than 0.1% by weight, there are some cases where a sufficient image density cannot be obtained.

As the pigment, a purified product is preferably used. Impurities can be removed by such a method as water washing, ultrafiltration, ion exchange, and absorption with activated carbon or zeolite. The purification method is not particularly limited, and it is preferred that the concentration of an inorganic matter ascribed to impurities of the colorant in the ink is 500 ppm or less, and more preferably 300 ppm or less.

As the water soluble organic solvent, known materials can be used. Examples thereof include a polyhydric alcohol, such as ethylene glycol diethylene glycol, propylene glycol polypropylene glycol butylene glycol, triethylene glycol, 1,5-pentanediol, 1,2,&hexanetriol and glycerin; a polyhydric alcohol ether, such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether and dipropylene glycol monobutyl ether; a nitrogen-containing solvent, such as pyrrolidone, N-methyl-2-pyrrolidone, cyclohexylpyrrolidone and triethanolamine; a monohydric alcohol, such as ethanol, isopropyl alcohol, butyl alcohol and benzyl alcohol; a sulfur-containing solvent, such as thiodiethanol, thiodiglycerol, sulfolane and dimethylsulfoxide; propylene carbonate; and ethylene carbonate.

The surfactant is added to adjust the surface tension of the ink. The surfactant is preferably nonionic and anionic surfactants, which are hard to influence the dispersion conditions of the pigment. Examples of the nonionic surfactant include polyoxyethylene nonylphenyl ether, polyoxyethylene octylphenyl ether, polyoxyethylene decylphenyl ether, a polyoxyethylene alkyl ether, a polyoxyethylene fatty acid ester, a sorbitan fatty acid ester, a polyoxyethylene sorbitan fatty acid ester, a fatty acid alkylolamide, acetylene alcohol ethylene oxide adduct, a polyethylene glycol polypropylene glycol block copolymer, a polyoxyethylene ether of a glycerin ester, and a polyoxyethylene ether of a sorbitol ester.

Examples of the anionic surfactant include an alkylbenzene sulfonate salt, an alkylphenyl sulfonate salt, an alkylnaphthalene sulfonate salt, a higher fatty acid salt, a sulfate ester salt and a sulfonate salt of a higher fatty acid, and a higher alkylsulfosuccinate salt.

Examples of the amphoteric surfactant include betaine, sulfobetaine, sulfatebetaine and imidazoline, In addition to these, a silicone surfactant, such as a polysiloxane polyoxyethylene adduct, a fluorine surfactant, such as an oxyethylene perfluoroalkyl ether, and a biosurfactant, such as spiculisporic acid, rhamnolipid and lysolecithin, may also be used.

While an ink using a self dispersing pigment has been described, the ink used in the invention is not limited thereto and can be produced by using a hydrophobic pigment. In this case, as described above, a pigment dispersant and, depending on necessity, an anionic compound are added to improve the pigment dispersibility.

Specific examples of the pigment dispersant include a polymer dispersant, an anionic surfactant, a cationic surfactant, an amphoteric surfactant and a nonionic surfactant. Among these pigment dispersants, such a pigment dispersant that becomes an organic anion upon ionization in water is referred to as an anionic pigment dispersion in the invention. The anionic pigment dispersant can also be used as an anionic compound in the ink described later.

While not particularly limited, the hydrophilic group in the pigment dispersant is preferably a carboxylic acid or a salt of a carboxylic acid. It is considered that this is because a carboxyl group forms a crosslinked structure with a polyvalent metallic ion from the polyvalent metallic salt coated on the surface of the recording paper, whereby the pigment has an appropriate aggregated structure.

The molecular weight of the pigment dispersant is preferably in a range of from 2,000 to 15,000, and particularly preferably in a range of from 3,500 to 10,000. The structures of the hydrophobic structure part and the hydrophilic structure par; and the compositional ratio thereof in the pigment dispersant can be selected among combinations of the pigments and the solvents.

The pigment dispersant may be used solely or as a mixture of two or more of them. The addition amount of the pigment dispersant cannot be defined unconditionally because it largely varies depending on the species of the pigment, and it is preferably in a range of from 0.1 to 100% by weight, more preferably in a range of from 1 to 70% by weight, and further preferably in a range of from 3 to 50% by weight, based on the amount of the pigment.

The anionic compound has such characteristics that the pigment in the ink is aggregated on the surface of the recording paper with the polyvalent metallic salt, and thus, in order to accelerate the aggregation, the anionic compound can be further preferably used in the ink in the invention. Examples of the anionic compound include an acid, such as a carboxylic acid and a sulfonic acid, a derivative thereof, and an anionic polymer emulsion, and the anionic pigment dispersants described in the foregoing can also be used.

While not particularly limited, the anionic compound preferably contains a carboxyl group. It is considered that this is because a carboxyl group forms a crosslinked structure with a polyvalent metallic ion from the polyvalent metallic salt coated on the surface of the recording paper, whereby the pigment has an appropriate aggregated structure.

The compound is preferably used in the form of a salt with a basic compound in order to improve water solubility. Examples of the compound forming a salt with the compound include an alkali metal, such as sodium, potassium and lithium, an aliphatic amine, such as monomethylamine, dimethylamine and trimethylamine, an alcohol amine, such as monomethanolamine, monoethanolamine, diethanolamine, triethanolamine and diisopropanolamine, and ammonia. Among these, a basic compound of an alkali metal, such as sodium, potassium and lithium, can preferably used. This is because a basic compound of an alkali metal is a strong electrolyte and thus has a large effect of accelerating dissociation of the acidic group.

The anionic compound contained in the ink preferably has a structure containing a hydrophilic part and a hydrophobic part, and it preferably contains a carboxylic acid or a salt of a carboxylic acid as a hydrophilic functional group. This is because a carboxyl group forms a crosslinked structure with a polyvalent metallic ion firm the polyvalent metallic salt coated on the surface of the recording paper and a cationic group of the cationic resin, whereby the pigment has an appropriate aggregated structure.

Specifically, a monomer constituting the hydrophilic part in the anionic compound is preferably at least one selected from acrylic acid, methacrylic acid, maleic acid and maleic anhydride. Examples of a monomer constituting the hydrophobic part in the anionic compound include styrene, a styrene derivative, such as α-methylstyrene and vinyltoluene, vinylcyclohexane, vinylnaphthalene, a vinylnaphthalene derivative, an alkyl acrylate ester, an alkyl methacrylate ester, a phenyl methacrylate ester, a cycloalkyl methacrylate ester, an alkyl crotonate ester, a dialkyl itaconate ester and a dialkyl maleate ester, and among these, at least one selected from styrene, alkyl, aryl or alkylaryl ester of acrylic acid and methacrylic acid is preferred.

The anionic compound may be used solely or as a mixture of two or more of them. The content of the anionic compound in the ink is preferably in a range of from 0.1 to 10% by weight, and more preferably in a range of from 0.3 to 5% by weight. When it is less than 0.1% by weight, there are some cases where the ink is poor in long term storage stability, and an optical density of an image is lowered, and when the content exceeds 10% by weight, there are some cases where the ink cannot be normally ejected, and an optical density of an image is lowered.

In order to control the characteristics of the ink, other components may be contained, for example, polyethyleneimine, a polyamine compound, polyvinylpyrrolidone, polyethylene glycol, a cellulose derivative, such as ethylcellulose and carboxyethylcellulose, polysaccharide and a derivative thereof, other water soluble polymers and polymer emulsions, cyclodextrin, a macrocyclic amine compound, a dendrimer, a crown ether, urea and a derivative thereof, and acetamide. Furthermore, depending on necessity, an antioxidant, an antifungal agent, an electroconductive agent, an ultraviolet absorbent and a chelating agent may also be contained. Examples of the chelating agent include ethylenediamine tetraacetic acid (EDTA), iminodiacetic acid (IDA), ethylenediamine di(o-hydroxyphenylacetic acid) (EDDHA), nitrilotracetic acid (NTA), dihydroxyethylglycin (DHEG), tans-1,2-cyclohexanediamine tetraacetic acid (CyDTA), diethylenetriamine-N,N,N',N'',N''-pentaacetic acid (DTPA) and glycol etherdiamine-N,N,N',N'-tetraacetic acid (GEDTA).

It is effective to add a viscosity adjusting agent, such as methylcellulose, ethylcellulose, a derivative of them, a glycerin compound, polyglycerin and a polyethylene oxide adduct and a polypropylene oxide adduct thereof, and a polysaccharide and a derivative thereof. Specific examples of the viscosity adjusting agent include glucose, fructose, mannitol, D-sorbit, dextran, xanthan gum, curdlan, cycloamylose, maltitol and derivatives thereof.

The viscosity of the ink used in the invention is preferably in a range of from 1.5 to 5.0 mPa.s, and more preferably in a range of from 1.5 to 4.0 mPa.s. The viscosity of the ink is measured by using a rotational viscometer (Rheomat 115, produced by Contraves AG) at a measuring temperature of 23° C. and a shearing rate of $1,400 \text{ s}^{-1}$.

The pH of the ink may be adjusted to a desired value, and examples of a material for adjusting the pH include potassium hydroxide, sodium hydroxide, lithium hydroxide, ammonium hydroxide, triethanoamine, diethanolamine, ethanol amine, 2-amino-2-methyl-1-propanl, ammonia, ammonium phosphate, potassium phosphate, sodium phosphate, lithium phosphate, sodium sulfate, an acetate, a lactate, a benzoate, acetic acid, hydrochloric acid, nitric acid, sulfuric acid, phosphoric acid, propionic acid and p-toluenesulfonic acid. In alternative, an ordinary pH buffer agent, such as Good Buffer.

The pH of the ink is preferably in a range of from 3 to 11, and particularly preferably in a range of from 45 to 9.5.

The ink used in the invention necessarily has a surface tension of from 20 to 35 mN/m. When the surface tension is less than 20 mN/m, the ink permeability to the recording paper is too large to fail to aggregate the pigment and the anionic compound in the ink, whereby the ink is penetrated into the interior of the recording paper, so as to cause reduction in image density and blur of characters. When the surface tension exceeds 35 mN/m, the ink permeability to the recording paper is too small to deteriorate drying property, and it is not preferred from the standpoint of measures for high-speed printing.

The surface tension of the ink is preferably in a range of from 25 to 35 mN/m, and more preferably in a range of from 28 to 32 mN/m.

The surface tension of the ink is measured by using a Wilhelmy surface tensiometer under conditions of 23° C. and 55% RH.

Examples of a method for adjusting the surface tension of the ink include a method of adding at least one selected from the foregoing surfactants, a polyhydric alcohol ether and a monohydric alcohol. In the case where a surfactant is added, it is preferred to select at least one from a nonionic surfactant and an anionic surfactant. The content of the compound in the ink is preferably in a range of from 0.01 to 3.0% by weight, more preferably in a range of from 0.03 to 2.0% by weight, and further preferably in a range of from 0.05 to 1.5% by weight. Particularly, in the case-where a surfactant is used solely, the content thereof is preferably in a range of from 0.3 to 1.5% by weight.

In the case where a polyhydric alcohol is used, at least one selected from a compound represented by the following formula (1) is used. The total content in the ink is preferably in a range of from 1 to 5% by weight, more preferably in a range of from 2 to 10% by weight, and further preferably in a range of from 3 to 8% by weight.

$$C_nH_{2n+1}(CH_2CRHO)_mH \tag{1}$$

wherein n represents an integer of from 1 to 6, m represents an integer of from 1 to 3, and R represents a hydrogen atom or an al group having from 1 to 5 carbon atoms.

In the case where a monohydric alcohol is added, such alcohols as ethanol, propanol and butanol are preferably used. The total content in the ink is preferably in a range of from 1.0 to 8.0% by weight, and more preferably in a range of from 2.0 to 5.0% by weight. The surfactant, the polyhydric alcohol ether and the monohydric alcohol may be simultaneously added.

The ink used in the invention can be obtained, for example, in the following manner. A prescribed amount of the pigment is added to an aqueous solution containing a prescribed amount of the pigment dispersion, and after sufficiently stirred, the solution is dispersed by using a dispersing apparatus. Coarse particles are removed from the dispersion, for example, by centrifugal separation, and then the water soluble organic solvent and the additives described in the foregoing are added and mixed thereto, followed by filtration. At this time, it is possible that a concentrated dispersion of the pigment is previously prepared and then diluted upon preparing the ink. Furthermore, a pulverizing step for the pigment may be employed before the dispersing step. Moreover, it is also possible that the water soluble organic solvent, water and the pigment dispersion are mixed, and then the pigment is added thereto, followed by dispersion by using a dispersing apparatus.

As the dispersing apparatus, commercially available products may be used. Examples thereof include a colloid mill, a flow jet mill, a slasher mill, a high-speed disperser, a ball mill, an attritor, a sand mill, a sand grinder, an ultrafine mill an Eiger mortar mill, a dinor mill, a pearl mill, an agitator mill, a cobol mill, a three-roll mill, a two-roll mill, an extruder, a kneader, a microfluidizer, a laboratory homogenizer and an ultrasonic wave homogenizer, and these may be used solely or in combination of two or more of them. In order to prevent contamination due to inorganic impurities, it is preferred to use a dispersing method using no dispersion medium. In this case, it is preferred to use a microfluidizer and an ultrasonic wave homogenizer. In Examples of the invention, dispersion is carried out with an ultrasonic wave homogenizer.

The ink using the pigment self-dispersible in water is produced, for example, in the following manner. The pigment is subjected to the surface modifying treatment, and the resulting pigment is added to water. After sufficient stirring, dispersion is carried out depending on necessity with the similar dispersing apparatus as in the foregoing. Coarse particles are removed from the dispersion, for example, by centrifugal separation, and then the prescribed solvent and the additives are added, followed by stirring, mixing and filtering.

The amount of an ink droplet ejected upon applying the ink used in the invention to a recording apparatus of the ink-jet method is preferably in a range of from 1 to 20 pL, and more preferably in a range of from 3 to 18 pL. In the case where the so-called thermal ink-jet method is employed, in which a droplet is formed by applying heat energy to effect recordation, and the amount of the droplet is in a range of from 1 to 20 pL and preferably in a range of from 3 to 18 pL, as described in the foregoing, it is preferred that the dispersed particle diameter of the pigment in the ink is in a range of from 20 to 120 mm in terms of a volume average particle diameter, and the number of coarse particles having a diameter of 500 nm or more is $5 \times 10^5$ or less in 2 $\mu$L of the ink. When the volume average particle diameter is less than 20 nm, there are some cases where a sufficient image density cannot be obtained When the volume average particle diameter exceeds 120 mm, clogging is liable to occur in a printing head to fail to assure stable ejecting property. When the number of coarse particles having a diameter of 500 nm or more exceeds $5 \times 10^5$ in 2 $\mu$L of the ink, there are also some cases where clogging is liable to occur in a printing head to fail to assure stable ejecting property. The number of coarse particles is more preferably $3 \times 10^5$ or less, and further preferably $2 \times 10^5$ or less.

The storage modulus at 24° C. of the ink is particularly preferably in a range of from $5 \times 10^{-4}$ to $1 \times 10^{-2}$ Pa. When the ink has a suitable elasticity in this range, the behavior thereof on the surface of the recording paper becomes favorable. The storage modulus herein is a value measured in a low shearing rate region in an angular velocity range of from 1 to 10 rad/s. The value can be conveniently measured by using an apparatus capable of measuring viscoelasticity in a low shearing rate region. Examples of the measuring apparatus include a VE type viscoelasticity analyzer (produced by Vilastic Scientific, Inc.) and a DCR viscoelasticity meter for extremely low viscosity (produced by Paar Physica, Inc.)

It is necessary in the ink-jet recording method of the invention that the aggregation degree of a pigment in the pigment ink, which is ejected from a printing head and is in contact with the surface of the recording paper, is 5 or more. The aggregation degree of a pigment herein is, as described in the foregoing, expressed by a ratio of the number of the pigment having a particle diameter of 1 $\mu$m or more contained in the ink immediately after contacting the surface of the recording paper to the number of the pigment having a particle diameter of 1 $\mu$m or more contained in the ink before contacting the surface of the recoding paper. That is, the dispersed particles of the pigment are aggregated and coagulated on the surge of the recording paper at the moment when the ink is made in contact with the surface of the recording paper, whereby even when the absorption rate of the ink is increased, sharp printing can be carried out at high speed printing, but the pigment does not flow out along with the vehicle in the ink.

The aggregation degree of a pigment in the ink can be obtained in the following manner. 3 mL of an ink is dropped on a surface of recording paper having a size of a square of 9 cm² under an environment of 22° C. and 55% RH and the ink is rapidly recovered and then measured for the number of coarse particles having a particle diameter of 1 $\mu$m or more A in the ink immediately after recovering by using a particle size distribution measuring apparatus (Model 770 Accusizer, produced by Particle Sizing System, Inc.). Separately, an ink that is not in contact with the recording paper is measured for the number of coarse particles B, and the ratio A/B is designated as the aggregation degree of a pigment.

In order to obtain the aggregation degree of a pigment of 5 or more, the recording paper and the ink used in the invention are preferably employed. The aggregation degree of a pigment is preferably 10 or more, and more preferably 100 or more.

In the ink-jet recording method of the invention, any apparatus can be used as far as it is a so-called ink-jet recording apparatus to obtain good printing quality. The ink-jet recording method of the invention can also be applied to a method having such a function in that a heating unit for the recording paper is provided during printing or before or after printing to heat the recording paper and the ink to a temperature of from 50 to 200° C. to accelerate absorption and fixation of the ink.

An example of an ink-jet recording apparatus suitable for practicing the method of the invention will be described. The example is in a mode referred to as a so-called multipath system, in which a recording head scans a surface of recording paper plural times to form an image.

One example of a method of ejecting an ink from a nozzle is a so-called thermal ink-jet method, in which an ink inside a nozzle is bubbled by heating with a heater provided inside the nozzle through electrification, and the ink is ejected by the pressure thereof. Another example thereof includes such a system in that a piezoelectric element is physically deformed through electrification, and an ink is ejected from a nozzle by utilizing a pressure caused by the deformation. A representative example of this system utilizes a piezoelectric semiconductor as the piezoelectric element. The method of the invention can be applied both the systems, and the invention is not limited to these systems. The invention is not limited to the following descriptions.

The nozzles are arranged in a direction substantially perpendicular to the main scanning direction of the head carriage. Specifically, the nozzles can be arranged in one line at a density of 800 per 1 inch. The number and the density of the nozzles can be arbitrarily determined. The nozzles can also be arranged in a staggered form in addition to the one line arrangement.

Ink tanks containing the inks used in the invention of respective colors, cyan, magenta, yellow and black, respectively, are attached to the upper parts of the recording heads as one unit therewith, respectively. The inks contained in the ink tanks are supplied to the recording heads corresponding to the respective colors. The ink tank and the head may be formed as one unit. In addition to the system, the invention may also be applied to other systems, in which an ink tank and a recording head are separately arranged, and the ink is supplied to the recording head through an ink supplying tube.

The recording heads are connected to signal cables. The signal cables transmit image information after processing a pixel processing part for the respective colors, cyan, magenta, yellow and black, to the recording heads.

The recording head is fixed on a head carriage. The head carriage is attached in a freely sliding manner in the main scanning direction along a guide rod and a carriage guide. A driving motor is rotationally driven at prescribed timing, whereby the head carriage is reciprocally driven in the main scanning direction through a timing belt.

A platen is fixed under the head carriage, and the recording paper used in the invention is transported onto the platen at prescribed timing with a transporting roller for paper transportation. The platen can be constituted, for example, with a molded material, such as plastics.

According to the procedures described in the foregoing, the recording paper and the ink used in the invention are employed, and thus an image can be formed on the surface of the recording paper. An example using four heads has been described for the multipath system, but the range, to which the ink-jet recording method of the invention can be applied, is not limited to the example. The invention can also be applied, for example, to such a system in that two heads, i.e., a black head and a color head, are provided, and in the color head, nozzles are divided along the arranging direction of the nozzle with the respective colors being assigned to the divided regions.

A second example of an ink-jet recording apparatus that is suitable for practicing the ink-jet recoding method of the invention will be described This example is referred to as a so-called FWA (full width array) system. In this system, a recording head has a width that is substantially equivalent to the width of the recording paper, and printing is completed by passing the recording paper under the head. The system can provide high productivity in comparison to the multipath system with the same scanning speed, and thus printing can be carried out at a higher rate than the laser recording method.

According to the foregoing manners, an image can be formed on the surface of the recording paper by using the recording paper and the ink used in the invention.

The ink-jet recording method of the invention can be applied to an ink-jet recording apparatus having a scanning speed of a printing head of 25 cm/sec or more. The ink-jet recording method of the invention can also be applied to a recording apparatus having a conveying speed of the recording paper of 6 cm/sec or more with a printing head being fixed.

The scanning speed of a printing head herein means a movement speed of the recording head in the case where the recording head scans the surface of the recording paper plural times to effect printing in the multipath method where the printing head runs in a direction perpendicular to the conveying direction of the recording paper.

Upon carrying out high speed printing at a printing rate of 10 ppm (10 sheets per minute) or more, it is necessary that the scanning speed of the printing head is 25 cm/sec or more, and in such a case, the distance between two kinds of inks having different colors becomes small, whereby intercolor breed (ICB) is liable to occur. It is also necessary to use an ink having a low surface tension to improve the drying property of the ink, which brings about formation of feathering and reduction in image density.

The conveying speed of the recording paper means a speed of the recording paper passing under the recoding head in the FWA system, which is a relatively new printing method for an ink-jet printer.

Because there is no necessity of scanning of the recording head plural times in the FWA system as different from the multipath system, high speed printing can be conveniently carried out at a conveying speed of the recording paper of 6 cm/sec or more, which deals with a printing rage of 10 ppm or more. However, it is necessary to eject a large amount of the ink at a time because printing cannot be carried out in a divided manner, and thus this brings about formation of feathering and ICB.

According to the ink-jet recording method of the invention, an image having high image quality without feathering or intercolor breed can be obtained owing to the effect of aggregation of the pigment in the ink upon contacting with the recording paper even in the case where such high speed printing is carried out in that the scanning speed of the printing head is 25 cm/sec or more in the multipath system, and even in the case where the conveying speed of the recording paper is 6 cm/sec or more with the printing head being fixed in the FWA system.

The scanning speed of the printing head is preferably 50 cm/sec or more, and more preferably 1 m/sec or more, from the standpoint of obtaining "productivity equivalent to laser printers". The conveying speed of the recording paper is preferably 10 cm/sec or more, and more preferably 21 cm/sec or more.

In the ink-jet recording method of the invention, it is necessary that the maximum ink injection amount is in a range of from 6 to 30 mL/m$^2$.

The maximum ink injection amount herein means an amount of an ink per unit area ejected through onetime scanning in the case where a solid image is formed by using an ink of one or more colors.

In either the multipath system or the FWA system, in order to apply a sufficient amount of an ink for forming a solid image with a small number of times of scanning to the recording paper, the maximum ink injection amount becomes as large as 6 mL/m² or more. However, an image without feathering or intercolor breed can be obtained as similar to the foregoing even upon high speed printing requiring such a large ink injection amount.

The maximum ink injection amount is preferably in a range of from 7 to 20 mL/m², and more preferably in a range of from 10 to 18 mL/m².

As described in the foregoing, according to the ink-jet recording method of the invention, printing with a sufficient image density can be carried out without occurrence of image defects, such as blur, even in an ink-jet recording apparatus carrying out high speed printing of a printing speed of 10 ppm or more.

EXAMPLE

The invention will be described in more detail with reference to the following examples, but the invention is not limited to the examples.

Recording paper used in the examples and the comparative examples will be described.

Recording Paper 1

Hardwood craft pulp is subjected to a bleaching treatment through an ECF multistage bleaching method containing an oxygen bleaching step, an alkali extraction step and a gas phase chlorine dioxide treatment step. The resulting pulp is adjusted by beating to make a freeness of 450 mL. 3 parts by weight of a bentonite filler, 3 parts by weight of a precipitated calcium carbonate filler and 0.1 part by weigh of an alkylketene dimer (AKD) internal sizing agent are mixed with 100 parts by weight of the pulp, followed by subjecting to paper making. A coating composition containing 94 parts by weight of water, 1 part by weight of cationic starch (Ace K, produced by Oji Corn Starch Co., Ltd.) and 5 parts by weight of sodium sulfate as an electroconductive agent is prepared as a surface sizing agent and subjected to size press to obtain recording paper having 0.2 g/m² of the cationic starch and 2.0 g/m² of the sodium sulfate coated thereon. The coating of the electroconductive agent is not necessary in the case where it is used only for ink-jet recording, and this is the same as in all the examples and the comparative examples-below.

Recording Paper 2

Hardwood craft pulp is subjected to a bleaching treatment through a TCF multistage bleaching method containing a xylanase bleaching step, an alkali extraction step, a hydrogen peroxide treatment step and an ozone treatment step. The resulting pulp is adjusted by beating to make a freeness of 450 mL. 3 parts by weight of a kaolin filler, 6 parts by weight of a precipitated calcium carbonate filler and 0.2 part by weight of an alkenylsuccinic anhydride (ASA) internal sizing agent are mixed with 100 parts by weight of the pulp, followed by subjecting to paper making. A coating composition containing 85 parts by weight of water, 5 parts by weight of cationic modified polyvinyl alcohol (Gohsefimer, produced by Nippon Synthetic Chemical Industry Co., Ltd.) and 10 parts by weight of calcium chloride is prepared as a surface sizing agent and subjected to size press to obtain recording paper having 0.3 g/m² of the cationic polyvinyl alcohol and 2.0 g/m² of the calcium chloride coated thereon.

Recording Paper 3

Softwood mechanical pulp is subjected to a bleaching treatment with hydrosulfide, and the resulting pulp is adjusted by beating to make a freeness of 450 mL. 8 parts by weight of a precipitated calcium carbonate filler and 0.02 part by weight of an alkenylsuccinic anhydride (ASA) internal sizing agent are mixed with 100 parts by weight of the pulp, followed by subjecting to paper making. A coating composition containing 88 parts by weight of water, 2 parts by weight of anionic polyvinyl alcohol (Poval 117, produced by Kuraray Co., Ltd.) and 10 parts by weight of an anionic polymer (polyvinyl potassium sulfate) is prepared as a surface sizing agent and subjected to size press to obtain recording paper having 0.1 g/m² of the anionic polyvinyl alcohol and 2.0 g/m² of the anionic polymer coated thereon.

Recording Paper 4

Hardwood craft pulp is subjected to a bleaching treatment through an ECF bleaching method, and the resulting pulp is adjusted by beating in the same manner as in Recording Paper 1. 3 parts by weight of a precipitated calcium carbonate filler, 3 parts by weight of a saponite filler and 2 parts by weight of a neutral rosin sizing agent are mixed with 100 parts by weight of the pulp, followed by subjecting to paper making. A coating composition containing 80 parts by weight of water, 5 parts by weight of polyethylene glycol (PEG), 5 parts by weight of a dicyan water proofing agent (Neofix FY, produced by Nicca Chemical Co., Ltd.) and 10 parts by weight of magnesium acetate is prepared as a surface sizing agent and subjected to size press to obtain recording paper having 2.0 g/m² of the polyethylene glycol, 0.05 g/m² of the dicyan water proofing agent and 2.5 g/m² of the magnesium acetate coated thereon.

Recording Paper 5

Hardwood craft pulp is subjected to a bleaching treatment through a TCF multistage bleaching method containing an oxygen treatment step, an alkali extraction step, a hydrogen peroxide treatment step and an ozone treatment step, and the resulting pulp is adjusted by beating. 8 parts by weight of a precipitated calcium carbonate filler and 0.1 part by weight of an alkylketene dimer (AKD) internal sizing agent are mixed with 100 parts by weight of the pulp, followed by subjecting to paper making. A coating composition containing 94 parts by weight of water, 1 part by weight of starch and 5 parts by weight of calcium nitrate is prepared as a surface sizing agent and subjected to size press to obtain recording paper having 0.2 g/m² of the starch and 2.0 g/m² of the calcium nitrate coated thereon.

Recording Paper 6

Hardwood craft pulp is subjected to a bleaching treatment through a TCF bleaching method, and the resulting pulp is adjusted by beating. 5 parts by weight of a precipitated calcium carbonate filler, 3 parts by weight of a bentonite filler and 0.05 part by weight of an alkylketene dimer (AKD) internal sizing agent are mixed with 100 parts by weight of the pulp, followed by subjecting to paper making. A coating composition containing 80 parts by weight of water, 5 parts by weight of starch, 10 parts by weight of a polycation water proofing agent (Neofix IJ-450, produced by Nicca Chemical Co., Ltd.) and 5 parts by weight of magnesium chloride is prepared as a surface sizing agent and subjected to size press to obtain recording paper having 0.2 g/m² of the starch, 2.0 g/m² of the polycation water proofing agent and 1.0 g/m² of the magnesium chloride coated thereon.

Recording Paper 7

Softwood mechanical pulp is subjected to a bleaching treatment with hydrosulfide, and the resulting pulp is adjusted by beating. 3 parts by weight of a kaolin filler, 5 parts by weight of a saponite filler and 0.1 part by weight of an alkenylsuccinic anhydride (ASA) internal sizing agent are mixed with 100 parts by weight of the pulp, followed by subjecting to paper making. A coating composition containing 94 parts by weight of water, 1 part by weight of starch and 5 parts by weight of a cationic polymer (quaternary ammonium chloride) is prepared as a surface sizing agent and subjected to size press to obtain recording paper having 0.5 g/m² of the starch and 0.5 g/m² of the cationic polymer coated therein.

Inks used in the examples and the comparative examples of the invention will be described.

Ink 1

A water soluble polymer of a sodium salt of a styrene-methacrylic acid copolymer (copolymerization monomer ratio: 50/50, weight average molecular weight: 7,000), is used as a dispersant for pigment dispersion in this ink.

45 parts by weight of an aqueous solution of the water soluble polymer (solid content: 10% by weight) and 210 parts by weight of ion exchanged water are mixed and stirred, to which 45 parts by weight of carbon black BPL (produced by Cabot Oil & Gas Corp.) is added, followed by stirring for 30 minutes. Thereafter, the mixture is dispersed with a microfluidizer to 10,000 psi per 30 paths. After the dispersing step, the pH of the dispersion is adjusted to 9 with a 1N NaOH aqueous solution. The dispersion is subjected to centrifugal separation (8,000 rpm, 15 minutes) with a centrifugal separating machine and then filtered through a 2 µm membrane filter. The resulting dispersion is diluted with pure water to obtain a pigment dispersion having a solid content of 10% by weight.

| Ethylene glycol | 12 parts by weight |
| Ethanol | 4 parts by weight |
| Urea | 5 parts by weight |
| Sodium salt of lauryl sulfate ester | 0.1 part by weight |

Deionized water is added to a mixture of the foregoing ingredients to make 50 parts by weight, followed by siring for 30 minutes. Thereafter, 50 parts by weight of the pigment dispersion is added thereto, followed by stirring for further 30 minutes. The mixture is filtered through a 2 µm membrane filter to produce an ink 1. The ink has a surface tension of 35 mN/m and a viscosity of 2.6 mPa.s. In the ink 1, the storage modulus is $1.0 \times 10^{-3}$ Pa at 24° C., and the number of coarse particles having a particle diameter of 500 nm or more is $11.2 \times 10^4$.

Ink 2

Cabojet 300 (produced by Cabot Oil & Gas Corp.) is subjected to a centrifugal separation treatment (8,000 rpm, 40 minutes) to obtain a pigment dispersion (pigment concentration: 14.4% by weight).

| Pigment dispersion | 35 parts by weighc |
| Diethylene glycol | 18 parts by weight |
| Urea | 5 parts by weight |
| Sodium ethylenediaminetetraacetate | 1 part by weight |

Deionized water is added to a mixture of the foregoing ingredients to make 100 parts by weight, and a 1N lithium hydroxide aqueous solution is added dropwise thereto until the pH reaches 8.0. Thereafter, the mixture is stirred for 30 minutes and then filtered through a 2 µm membrane filter to produce an ink 2. The ink has a surface tension of 33 mN/m and a viscosity of 2.1 mPa.s. In the ink 2, the storage modulus is $5.0 \times 10^{-3}$ Pa at 24° C., and the number of coarse particles having a particle diameter of 500 nm or more is $18.6 \times 10^4$.

Ink 3

Cabojet 300 (produced by Cabot Oil & Gas Corp.) is subjected to a centrifugal separation treatment (8,000 rpm, 40 minutes) to obtain a pigment dispersion (pigment concentration: 14.4% by weight).

| Pigment dispersion | 35 parts by weight |
| Diethylene glycol | 20 parts by weight |
| Polyoxyethylene(4) 2-ethylhexyl ether (EH4, produced by Aoki Oil Industrial Co., Ltd.) | 0.25 part by weight |
| Urea | 6 parts by weight |
| Isopropyl alcohol | 2 parts by weight |

Deionized water is added to a mixture of the, foregoing ingredients to make 100 parts by weight, and the mixture is stirred for 30 minutes. The mixture is then filtered through a 2 µm membrane filter. The ink has a surface tension of 31 mN/m and a viscosity of 2.2 mPa.s. The storage modulus is $6.0 \times 10^{-4}$ Pa at 24° C., and the number of coarse particles having a particle diameter of 500 nm or more in the Ink 3 is $24.6 \times 10^4$.

| <Ink 4> | |
|---|---|
| Pigment (C.I. Pigment Blue 15:3) | 4 parts by weight |
| Styrene-acrylic acid-potassium acrylate copolymer | 15 parts by weight |
| Diglycein ethylene oxide adduct | 5 parts by weight |
| Sulfolane | 5 parts by weight |
| Surfactant (Nonion E-215, produced by NOF Corp.) | 0.03 part by weight |
| Polyvinyl potassium sulfate | 0.5 part by weight |

Deionized water is added to a mixture of the foregoing ingredients to make 100 parts by weight, and the mixture is stirred for 30 minutes. The mixture is then filtered through a 2 µm membrane filter. The ink has a surface tension of 30 mN/m and a viscosity of 2.8 mPa.s. The storage modulus is $25 \times 10^{-3}$ Pa at 24° C., and the number of coarse particles having a particle diameter of 500 nm or more in the Ink 4 is $0.08 \times 10^4$.

| <Ink 5> | |
|---|---|
| Pigment (C.I. Pigment Red 122) | 4 parts by weight |
| Styrene-acrylic acid-sodium maleate copolymer | 1.5 parts by weight |
| Diethylene glycol | 10 parts by weight |
| Propylene glycol | 5 parts by weight |
| Thiodiethanol | 5 parts by weight |
| Surfactant (Surfynol 485, produced by Nissin Chemical Industry Co., Ltd.) | 0.03 part by weight |

Deionized water is added to a mixture of the foregoing ingredients to make 100 parts by weight, and the mixture is stirred for 30 minutes. The mixture is then filtered through a 2 µm membrane filter. The ink has a surface tension of 28 mN/m and a viscosity of 2.8 mPa.s. The storage modulus is $1.0 \times 10^{-2}$ Pa at 24° C., and the number of coarse particles having a particle diameter of 500 nm or more in the Ink 5 is $0.03 \times 10^4$.

<Ink 6>

| | |
|---|---|
| Surface-Created pigment (C.I. Pigment Yellow 17) | 4 parts by weight |
| Styrene-styrene sulfonic acid-sodium styrene sulfonate copolymer | 1.5 parts by weight |
| Glycerin | 15 parts by weight |
| Triethylene glycol monobutyl ether | 5 parts by weight |
| Surfactant (Surfynol TO; produced by Nissin Chemical Industry Co., Ltd.) | 0.03 part by weight |

Deionized water is added to a mixture of the foregoing ingredients to make 100 parts by weight, and the mixture is stirred for 30 minutes. The mixture is then filtered through a 2 μm membrane filter. The ink has a surface tension of 29 mN/m and a viscosity of 2.9 mPa.s. The storage modulus is $1.0 \times 10^{-2}$ Pa at 24° C., and the number of coarse particles having a particle diameter of 500 nm or more in the Ink 6 is $0.03 \times 10^4$.

The characteristics of the recording paper and the inks are shown in Table 1 below.

Example 1

Printing is carried out with combinations of the Recording Paper 2 and the Inks 2 and 6 in a thermal ink-jet recording apparatus for various evaluations. The printing is carried out under an environment of 23° C. and 55% RH by using a bench for evaluating multipath printing equipped with four recording heads as an ink-jet recording apparatus. The nozzle pitch is 800 dpi, the number of nozzles is 256, the amount of a droplet is about 15 pL, the maximum ink injection amount is about 15 mL/m$^2$, and the printing mode is one-sided batch printing at a head scanning speed of about 45 cm/sec.

The evaluations will be described.

Measurement of Properties of Ink

The surface tension is measured by using a Wilhelmy surface tensiometer under an environment of 23° C. and 55% RH. The viscosity is measured by using a rotational viscometer (Rheomat 115, produced by Contraves AG) in such a manner that an ink to be measured is placed in a measurement vessel, which is installed in the apparatus according to the specified method. The measuring temperature is 23° C., and the shearing rate is 1,400 s$^{-1}$.

Optical Density of Image

A solid patch, part after one day from printing is measured for an optical density by u X-Rite 369 (produced by X-Rite, Inc.).

Evaluation of Intercolor Breed (ICB)

A black ink and a color ink are printed to patches of 2 cm×2 cm, which are in contact with each other. Color mixture of the printed matters in contact with each other is evaluated by sensory evaluation with 10 subjects according to the following standard.

A: No color mixing is observed.

B: Color mixing is observed but is allowable.

C: Unallowable color mixing is observed.

Evaluation of Feathering

Characters in a font size of 8 points are printed with a black ink and a color ink. The printed quality is evaluated by visual observation according to the following standard.

A: No blur is observed in all kanji characters and hiragana characters.

B: Blur is observed in a small part of kanji chart and hiragana charmers.

C: Blur is observed in kanji characters and hiragana characters, which are not suitable for practical use.

Evaluation of Drying Time of Ink

The drying time of the ink is evaluated by pressing paper on an image part immediately after printing and observing transference. The period of time from printing until transference to the paper is not measured. A solid patch part is used as the image part and the evaluation is made according to the following standard.

A$^+$: 2 seconds or less

A: 2 seconds or more and less than 5 seconds

B: 5 seconds or more and less than 10 seconds

C: 10 seconds or more

Evaluation of Water Resistance

A patch density of a printed part of 2 cm×2 cm with a color ink is measured with a Macbeth densitometer. After allowing to stand for 24 hours from completion of printing, the image is immersed in water for 3 minutes. After taken out the image therefrom, the image is dried, and the density thereof is again measured. The density residual ratio of the printed image is obtained, and evaluation of water resistance is made according to the following standard.

A: The density residual ratio is 90% or more.

B: The density residual ratio is 80% or more and less than 90%.

C: The density residual ratio is less than 80%.

Examples 2 to 6 and Comparative Examples 1 to 3

The combinations of the ink and the recording paper shown in Table 1 are subjected to the same evaluations as in Example 1.

The results of the Examples and the Comparative Examples are shown in Table 2.

TABLE 1

| | | Recording paper | | | | Ink | | |
|---|---|---|---|---|---|---|---|---|
| | No. | Volume resistivity ($\Omega \cdot cm$)/ Surface resistance ($\Omega$ per square) | Stöckigt sizing degree (sec) | Smoothness degree (sec) | Formation index | No. | Surface tension (mN/m) | Aggregation degree of pigment |
| Example 1 | 2 | $1.2 \times 10^9$/ $2.0 \times 10^{10}$ | 25 | 60 | 25 | 2 | 33 | 15 |
| | | | | | | 6 | 29 | 10 |
| Example 2 | 5 | $1.0 \times 10^{10}$/ $1.0 \times 10^{11}$ | 15 | 50 | 20 | 2 | 33 | 12 |
| | | | | | | 4 | 30 | 15 |

TABLE 1-continued

|  |  | Recording paper | | | | Ink | | |
|---|---|---|---|---|---|---|---|---|
|  |  | Volume resistivity | Stöckigt | | | | | |
|  | No. | (Ω · cm)/ Surface resistance (Ω per square) | sizing degree (sec) | Smoothness degree (sec) | Formation index | No. | Surface tension (mN/m) | Aggregation degree of pigment |
| Example 3 | 7 | $9.3 \times 10^{10}/$ $5.0 \times 10^{11}$ | 20 | 70 | 30 | 2 4 | 33 30 | 15 12 |
| Example 4 | 6 | $2.5 \times 10^{9}/$ $2.3 \times 10^{11}$ | 50 | 50 | 25 | 2 4 | 33 30 | 25 23 |
| Example 5 | 4 | $1.5 \times 10^{10}/$ $1.7 \times 10^{11}$ | 30 | 50 | 20 | 1 5 | 35 28 | 5 6 |
| Example 6 | 6 | $2.5 \times 10^{9}/$ $2.3 \times 10^{11}$ | 30 | 50 | 25 | 3 4 | 31 30 | 9 8 |
| Comparative Example 1 | 1 | $3.0 \times 10^{11}/$ $5.0 \times 10^{11}$ | 10 | 50 | 25 | 1 5 | 35 28 | 2 1.3 |
| Comparative Example 2 | 1 | $3.0 \times 10^{11}/$ $5.0 \times 10^{11}$ | 10 | 50 | 25 | 2 4 | 33 30 | 3 2.3 |
| Comparative Example 3 | 3 | $2.0 \times 10^{10}/$ $5.0 \times 10^{10}$ | 150 | 230 | 20 | 2 4 | 33 30 | 1 1 |

TABLE 2

|  |  |  | Results of evaluation of image qualilty | | | | |
|---|---|---|---|---|---|---|---|
|  | Recording paper No. | Ink No. | Optical density | Intercolor breed | Feathering | Drying property | Water resistance |
| Example 1 | 2 | 2 6 | 1.41 1.20 | A | B | A | A |
| Example 2 | 5 | 2 4 | 1.40 1.30 | A | A | A+ | A |
| Example 3 | 7 | 2 4 | 1.43 1.25 | A | A | A | A |
| Example 4 | 6 | 2 4 | 1.51 1.37 | A | A | A | A |
| Example 5 | 4 | 1 5 | 1.38 1.19 | A | B | A | A |
| Example 6 | 6 | 3 4 | 1.42 1.20 | A | B | A | A |
| Comparative Example 1 | 1 | 1 5 | 1.17 0.89 | B | C | A+ | B |
| Comparative Example 2 | 1 | 2 4 | 1.20 0.94 | B | C | A+ | B |
| Comparative Example 3 | 3 | 2 4 | 1.16 0.87 | C | C | C | C |

Example 7

Printing is carried out with combinations of the recoding paper and the ink used in Example 1 in a thermal ink-jet recording apparatus for various evaluations. The Printing is carried out under an environment of 23° C. and 55% RH by using a bench for evaluating FWA printing equipped with six recording heads as an ink-jet recording apparatus. The nozzle pitch is 800 dpi the number of nozzles is 960, the amount of a droplet is about 10 pL, the maximum ink injection amount is about 10 mL/m², and the head scanning speed of the recording paper is about 38 cm/sec.

Examples 8 to 12 and Comparative Examples 4 to 6

The combinations of the ink and the recording paper as in Examples 2 to 6 and Comparative Examples 1 to 3 shown in Table 1 are subjected to the same evaluations as in Example 7.

The results of the Examples and the Comparative Examples are shown in Table 3.

TABLE 3

|  |  |  | Results of evaluation of image quality | | | | |
|---|---|---|---|---|---|---|---|
|  | Recording paper No. | Ink No. | Optical denaity | Intercolor breed | Feathering | Drying property | Water resistance |
| Example 7 | 2 | 2 6 | 1.40 1.12 | A | B | A+ | A |

TABLE 3-continued

| | Recording paper No. | Ink No. | Optical denaity | Intercolor breed | Feathering | Drying property | Water resistance |
|---|---|---|---|---|---|---|---|
| Example 8 | 5 | 2 | 1.35 | A | A | A+ | A |
| | | 4 | 1.20 | | | | |
| Example 9 | 7 | 2 | 1.40 | A | B | A+ | A |
| | | 4 | 1.25 | | | | |
| Example 10 | 6 | 2 | 1.45 | A | A | A+ | A |
| | | 4 | 1.35 | | | | |
| Example 11 | 4 | 1 | 1.35 | A | A | A+ | A |
| | | 5 | 1.15 | | | | |
| Example 12 | 6 | 3 | 1.35 | A | B | A+ | A |
| | | 4 | 1.35 | | | | |
| Comparative Example 4 | 1 | 1 | 1.14 | B | C | A+ | B |
| | | 5 | 0.85 | | | | |
| Comparative Example 5 | 1 | 2 | 1.15 | B | C | A+ | B |
| | | 4 | 0.90 | | | | |
| Comparative Example 6 | 3 | 2 | 1.12 | C | C | C | C |
| | | 4 | 0.85 | | | | |

As described in Tables 2 and 3, in the case where recordation is carried out according to the ink-jet recording method of the invention as in Examples, not only the image quality is favorable, but also no problem occurs in drying property and water resistance.

In the ink-jet recording method in Comparative Examples, on the other hand, some kinds of problems occur in image quality and/or drying property and water resistance.

According to the invention, such an ink-jet recording method can be provided in that even in the case where high speed printing of 10 ppm or more for A4 size paper by an ink-jet recording method is carried out, feathering is low, absorption property of an ink is good, and the water resistance of the resulting image is excellent upon printing on ordinary paper. Furthermore, according to the invention, such an ink-jet recording method can be provided in that the printed image has small intercolor breed, has a high optical density and is excellent in coloring property, and the ink has a late penetration rate into recording paper.

The entire disclosure of Japanese Patent Application No. 2002-178355 filed on Jun. 19, 2002 including specification, claims and abstract is incorporated herein by reference in its entirety.

What is claimed is:

1. An ink-jet recording method comprising:
    printing on recording paper having base paper containing pulp fibers and a filler by using a pigment ink of at least one color at a scanning speed of a printing head of 25 cm/sec or more and a maximum ink injection amount in a range of from 6 to 30 mL/m², the pigment ink having a surface tension in a range of from 20 to 35 mN/m, and an aggregation degree of a pigment contained in the pigment ink in contact with a surface of the recording paper being 5 or more.

2. The ink-jet recording method as claimed in claim 1, wherein the recording paper has a smoothness degree in a range of from 20 to 100 seconds and a formation index of 20 or more.

3. The ink-jet recording method as claimed in claim 1, wherein the recording paper comprises base paper having at least one of a polyvalent metallic salt and a cationic resin coated thereon in a coating amount in a range of from 0.1 to 3 g/m².

4. The ink-jet recording method as claimed in claim 1, wherein the recording paper has a surface resistance on a surface to be subjected to printing in a range of from $1.0\times10^9$ to $1.0\times10^{11}$ Ω per square, and the recording paper has a volume resistivity in a range of from $1.0\times10^{10}$ to $1.0\times10^{12}$ Ω·cm.

5. The ink-jet recording method as claimed in claim 1, wherein the base paper has a fiber orientation ratio in a range of from 1.0 to 1.55.

6. The ink-jet recording method as claimed in claim 1, wherein the base paper has air permeability in a range of from 10 to 30 seconds.

7. The ink-jet recording method as claimed in claim 1, wherein the base paper has a mixing ratio of waste paper pulp in a range of from 50 to 100% by weight based on the total pulp fibers.

8. The ink-jet recording method as claimed in claim 3, wherein the polyvalent metallic salt is selected from a calcium salt, a magnesium salt and aluminum salt.

9. The ink-jet recording method as claimed in claim 1, wherein the ink contains an anionic compound.

10. The ink-jet recording method as claimed in claim 1, wherein an amount of an ink droplet of the ink ejected is in a range of from 1 to 20 pL.

11. An ink-jet recording method comprising:
    printing on recording paper having base paper containing pulp fibers and a filler by using a pigment ink of at least one color at a conveying speed of the paper of 6 cm/sec or more with a printing head being fixed and a maximum ink injection amount in a range of from 6 to 30 mL/m², the pigment ink having a surface tension in a range of from 20 to 35 mN/m, and an aggregation degree of a pigment contained in the pigment ink in contact with a surface of the recording paper being 5 or more.

12. The ink-jet recording method as claimed in claim 11, wherein the recording paper has a smoothness degree in a range of from 20 to 100 seconds and a formation index of 20 or more.

13. The ink-jet recording method as claimed in claim 11, wherein the recording paper comprising base paper having at least one of a polyvalent metallic salt and a cationic resin coated thereon in a coating amount in a range of from 0.1 to 3 g/m².

14. The ink-jet recording method as claimed in claim 11, wherein the recording paper has a surface resistance on a surface to be subjected to printing in a range of from $1.0\times10^9$ to $1.0 \times 10^{11}$ Ω per square, and the recording paper has a volume resistivity in a range of from $1.0 \times 10^{10}$ to $1.0 \times 10^{12}$ Ω·cm.

15. The ink-jet recording method as claimed in claim 11, wherein the base paper has a fiber orientation ratio in a range of from 1.0 to 1.55.

16. The ink-jet recording method as claimed in claim 11, wherein the base paper has air permeability in a range of from 10 to 30 seconds.

17. The ink-jet recording method as claimed in claim 11, wherein the base paper has a mixing ratio of waste paper pulp in a range of from 50 to 100% by weight based on the total pulp fibers.

18. The ink-jet recording method as claimed in claim 13, wherein the polyvalent metallic salt is selected from a calcium salt, a magnesium salt and aluminum salt.

19. The ink-jet recoding method as claimed in claim 11, wherein the ink contains an anionic compound.

20. The ink-jet recording method as claimed in claim 11, wherein an amount of an ink droplet of the ink ejected is in a range of from 1 to 20 pL.

* * * * *